(12) United States Patent
Hatzav et al.

(10) Patent No.: US 8,462,395 B2
(45) Date of Patent: Jun. 11, 2013

(54) DEVICE FOR DETECTING THE PRESENCE OF A TANGIBLE DOCUMENT IN AN IMAGE ACQUISITION APPARATUS

(75) Inventors: Iuval Hatzav, Culver City, CA (US); Ilan Ben-Shahar, Savion (IL); Giyora Sharaby, Moshav Neve Yarak (IL); Daniel Hatzav, Hod Hasharon (IL)

(73) Assignee: CSSN Inc. Card Scanning Solutions, Culver City, CA (US)

( * ) Notice: Subject to any disclaimer, the term of this patent is extended or adjusted under 35 U.S.C. 154(b) by 948 days.

(21) Appl. No.: 12/554,912

(22) Filed: Sep. 6, 2009

(65) Prior Publication Data

US 2011/0058229 A1 Mar. 10, 2011

(51) Int. Cl.
*H04N 1/04* (2006.01)
*G06K 7/00* (2006.01)

(52) U.S. Cl.
USPC ............................ 358/474; 358/497; 362/154

(58) Field of Classification Search
None
See application file for complete search history.

(56) References Cited

U.S. PATENT DOCUMENTS

| | | | |
|---|---|---|---|
| 6,169,612 B1 * | 1/2001 | Deguchi | 358/488 |
| 2010/0213392 A1 * | 8/2010 | Hatzav et al. | 250/492.1 |
| 2011/0261423 A1 * | 10/2011 | Hatzav et al. | 358/498 |
| 2012/0162723 A1 * | 6/2012 | Fujii | 358/474 |

FOREIGN PATENT DOCUMENTS

EP 469561 A2 * 2/1992

\* cited by examiner

*Primary Examiner* — Gabriel Garcia
*Assistant Examiner* — Pawandeep Dhingra (57) ABSTRACT

An image acquisition apparatus, including a housing, the housing includes an internal space and a substantially transparent surface for supporting a tangible document during an image acquisition operation, a document sensing device for detecting if at least a portion of the transparent surface is covered by the tangible document, the document sensing device including a transparent support structure for supporting at least one edge of the tangible document, a layer of coating configured to reflect light, wherein the layer of coating covering at least a portion of the external surfaces of the transparent support structure, a first light source and a light intensity sensor disposed inside the internal space.

11 Claims, 6 Drawing Sheets

Fig. 6
Cross-section AA'

DEVICE FOR DETECTING THE PRESENCE OF A TANGIBLE DOCUMENT IN AN IMAGE ACQUISITION APPARATUS

FIELD OF THE INVENTION

The present invention relates to the operation of an image acquisition apparatus of tangible documents and more particularly, this invention is directed to a device for detecting the presence of a tangible document in an image acquisition apparatus, and thereby commencement of the document imaging operation.

BACKGROUND OF THE INVENTION

There exist in today's market devices, such as document scanners, which serve applications for which it is desirable to illuminate the scanned object, typically a document, with substantially uniform illumination. The scanned documents, for example ID cards, drivers' license, business cards and the like, are typically analyzed to extract information from the scanned document and non-uniform illumination degrades the ability to extract the desired information.

A variety of devices for detecting the presence of a document to be scanned exists, in particular for flat bed scanner, having a lid. One method is measuring the distance traveled by a light beam, thereby determining if the beam is returned from the lid or a document placed on the transparent surface. In other methods a switch is activated, when the lid is closed, whereby the scanning operation begins.

Typically, in portable scanning/image acquisition apparatuses, the transparent surface on which the document to be scanned is placed is in a generally upright or inclined orientation, whereby the tangible document is supported by a supporting element to prevent the document from sliding down due to the force of gravity. Such scanners/image acquisition apparatuses do not include a lid.

Figure 1:
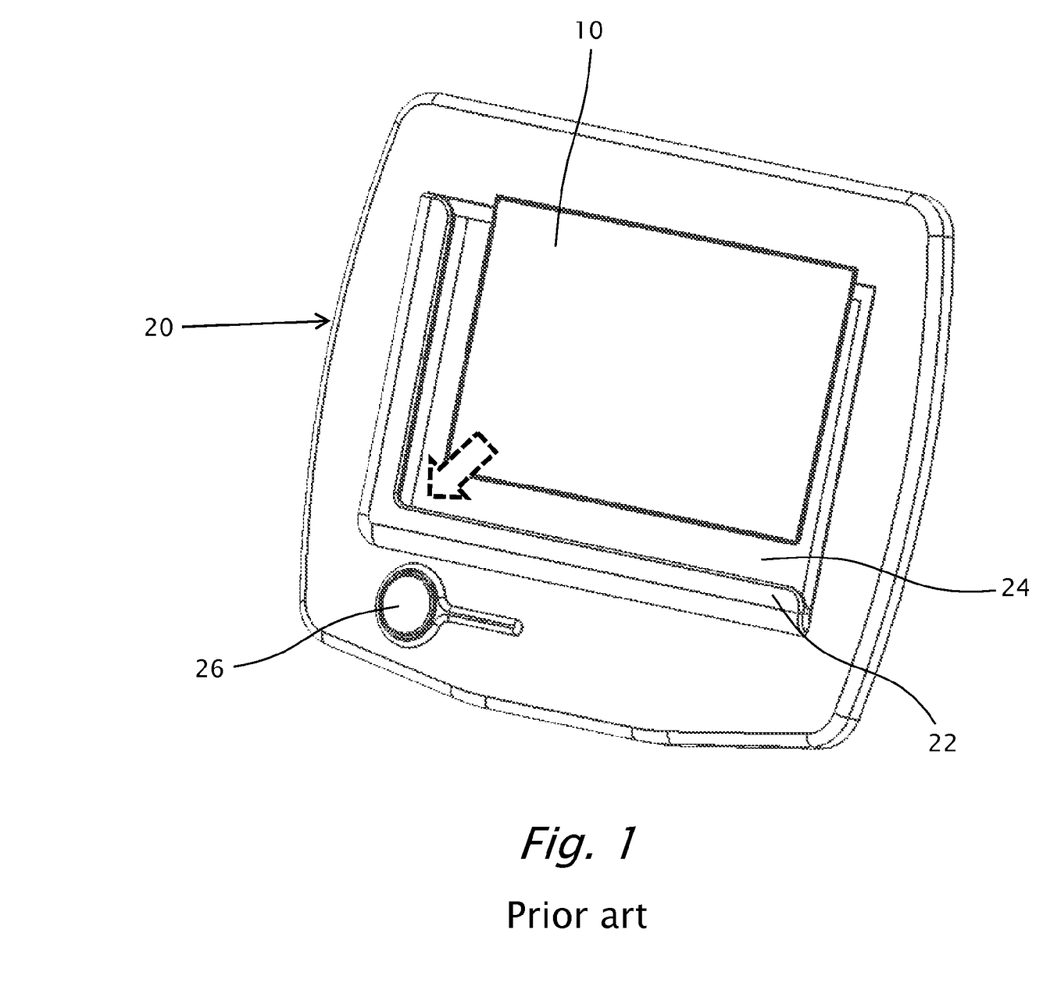
FIG. 1 (Prior art) illustrates a portable image acquisition apparatus for acquiring image frames of documents, operable by depressing a button.

One such portable image acquisition apparatus is provided by Iuval Hatzav et al in US application 20080285094 ('094), the disclosure of which is included herein by reference. Referring to FIG. 1 (Prior art), an image acquisition apparatus 20 operable by pressing on button 26, as provided by '094, is shown. A document 10 is place adjacent to a substantially transparent window, having an external surface 24, and is supported by supporting structure 22. The imaging operation of document 10 commences when button 26 is depressed. A camera (not shown), disposed inside the internal space of housing 28, acquires an image of document 10, the image being associated with tangible document 10.

One method to sense the presence of a document 10 on external surface 24, to automatically start the imaging operation, is by pacing a laser diode coupled with a photodiode inside internal space of housing 28. The laser is directed towards the transparent window. When transparent surface 24 is exposed, a substantial portion of the light passes through the transparent window and does not return to be sensed by the photodiode. When transparent surface 24 is exposed, a substantial portion of the light passes through the transparent window and does not return to be sensed by the photodiode. When a document 10 is positioned on external surface 24, a substantial portion of the light is reflected back by document 10 and sensed by the photodiode, whereby commencing the imaging operation. In this method, the laser beam may endanger bodies positioned in the path of the laser beam.

Thus, there is a need for and it would be advantageous to have an image apparatus that is activated by placing a document to be imaged on a substantially transparent window surface of the apparatus.

SUMMARY OF THE INVENTION

According to the teachings of the present invention, there is provided an image acquisition apparatus, including a housing. The housing includes an internal space and a substantially transparent surface for supporting a tangible document during an image acquisition operation, a document sensing device for detecting if at least a portion of the transparent surface is covered by the tangible document, the document sensing device including a transparent support structure for supporting at least one edge of the tangible document, a layer of coating configured to reflect light, wherein the layer of coating covering at least a portion of the external surfaces of the transparent support structure, a first light source and a light intensity sensor disposed inside the internal space.

The transparent support includes a first supporting element having a first supporting surface for supporting a first edge of the tangible document, wherein the supporting surface is disposed in alignment with a first edge of the transparent surface. The transparent support further includes a first transparent attachment structure for firmly attaching the support structure to the housing.

The first light source is disposed inside the image acquisition apparatus, directionally illuminating the first attachment structure towards the first supporting element. The layer of coating reflects a substantial portion of the light transmitted by the first light source, towards the transparent surface and the internal space.

A substantial portion of the light is sensed by the light intensity sensor, the transparent surface being exposed, whereby the light intensity sensor detected a high intensity level, and wherein when the tangible document blocks a substantial portion of the light from reaching the transparent surface, the light intensity sensor detected a low intensity level.

The difference between the high intensity level and the low intensity level is associated with the presence of the tangible document on the transparent surface.

In variations of the present invention, the image acquisition apparatus further includes an image sensor disposed inside the internal space for acquiring an image associated with the tangible document, and wherein the image sensor also used as the first light intensity sensor.

Typically, the transparent surface is in a generally upright or inclined orientation and wherein the first edge of the transparent surface is generally horizontal, whereby during an imaging operation, the tangible document is supported by the first supporting element, resisting the force of gravity. It should be noted that the transparent surface can be in any orientation during the operation of image acquisition apparatus of the present invention.

Preferably, the transparent support further includes a second supporting element, having a second supporting surface for supporting a second edge of the tangible document, wherein the supporting surface is disposed in alignment with a second edge of the transparent surface. The second supporting element further includes, in such option, a second transparent attachment structure for firmly attaching the support structure to the housing.

Preferably, the second supporting element is substantially perpendicular to the first supporting element. The second supporting element and the first supporting element form an L-shaped structure, joining at a corner, wherein a second light source is disposed inside the image acquisition apparatus, coupled with the second attachment structure, thereby directionally illuminating the second attachment structure towards the second supporting element.

When the tangible document is positioned adjacent to the second supporting surface, the tangible document blocks a substantial portion of the light transmitted by the second light source through the second supporting element, from reaching the transparent surface and thereby from reaching the light intensity sensor, whereby the light intensity sensor detects a low intensity level.

It should be noted that the distance the first and second transparent attachment structures from the corner is inversely proportional to the alignment accuracy of the tangible document on the transparent surface.

In variations of the present invention, at least one additional transparent attachment structure is positioned at a distal distance from the corner with respect to the first supporting element.

In variations of the present invention, at least one of the additional attachment structure is positioned at a distal distance from the corner with respect to the first attachment structure, the at least one additional attachment structure is coupled with a light source.

Optionally, the attachment structure selected from the group consisting of the first attachment structure, the second attachment structure and the additional attachment structures, is a boss type attachment structure.

BRIEF DESCRIPTION OF THE DRAWINGS

The present invention will become fully understood from the detailed description given herein below and the accompanying drawings, which are generally not drawn to scale and are given by way of illustration only and thus, not limitative of the present invention, and wherein.

DETAILED DESCRIPTION OF THE INVENTION

Before explaining embodiments of the invention in detail, it is to be understood that the invention is not limited in its application to the details of construction and the arrangement of the components set forth in the host description or illustrated in the drawings.

Unless otherwise defined, all technical and scientific terms used herein have the same meaning as commonly understood by one of ordinary skill in the art of the invention belongs. The methods and examples provided herein are illustrative only and not intended to be limiting.

By way of introduction, the present invention provides an apparatus for a document image acquisition apparatus, facilitating automatic commencing of the imaging operation, when the document is place in position for imaging.

Figure 2:
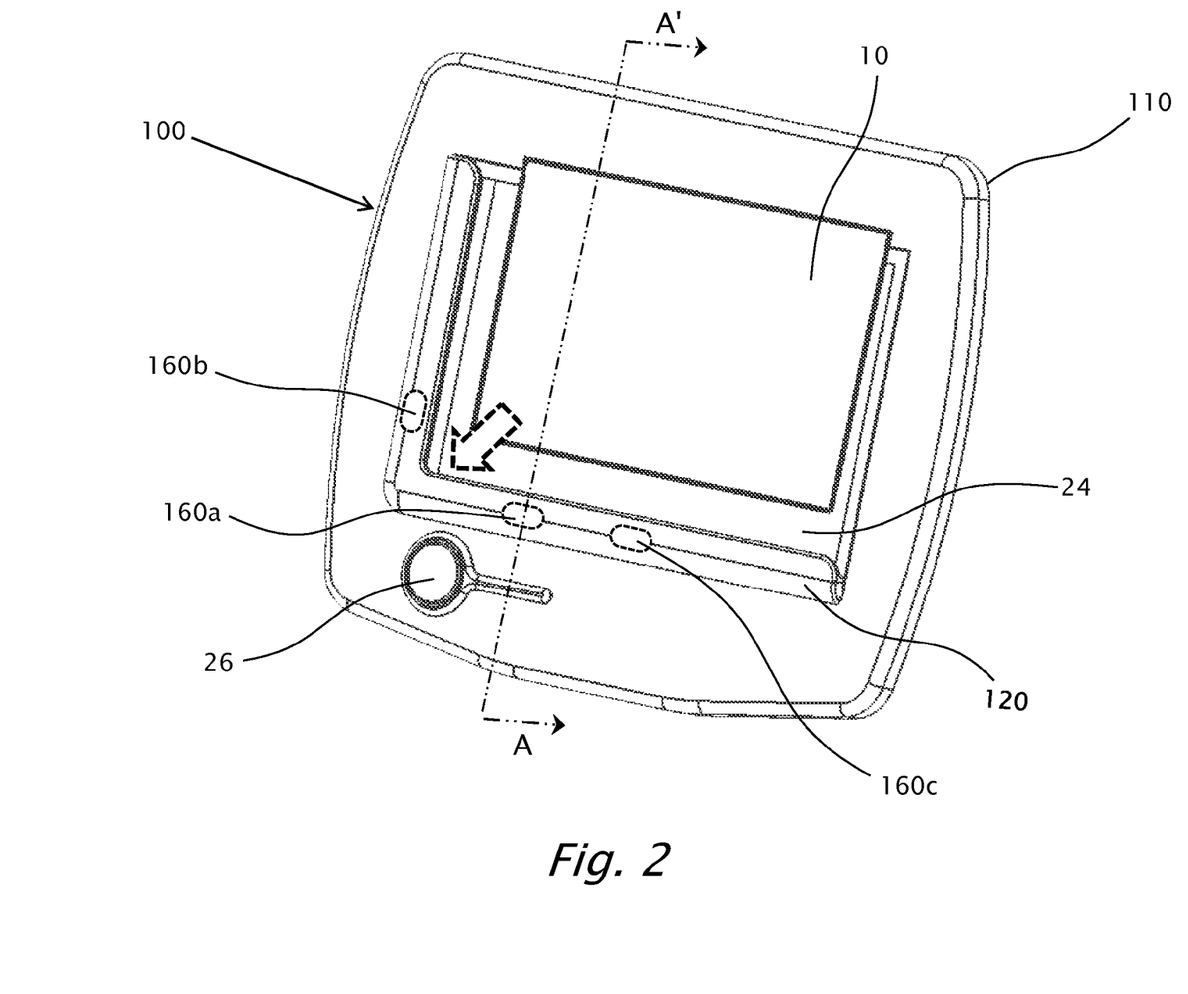
FIG. 2 illustrates a perspective view of a portable image acquisition apparatus for acquiring image frames of documents, according to embodiments of the present invention, whereas the image acquisition operation is activated by placing the document in imaging position.

FIG. 2 illustrates a perspective view of a portable image acquisition apparatus 100 for imaging documents 10, according to embodiments of the present invention, whereas the imaging operation is activated by placing document 10 in imaging position.

Image acquisition apparatus 100 includes a substantially transparent window having an external surface 24, a housing 110 having an internal space and a supporting structure 120 for holding document 10 in place for imaging. Image acquisition apparatus 100 further includes a camera (not shown), disposed inside the internal space of housing 110, light sources 160 disposed in housing 110 such that light does not enter the internal space of housing 110 directly, but is rather directed to illuminate supporting structure 110.

Figure 3:
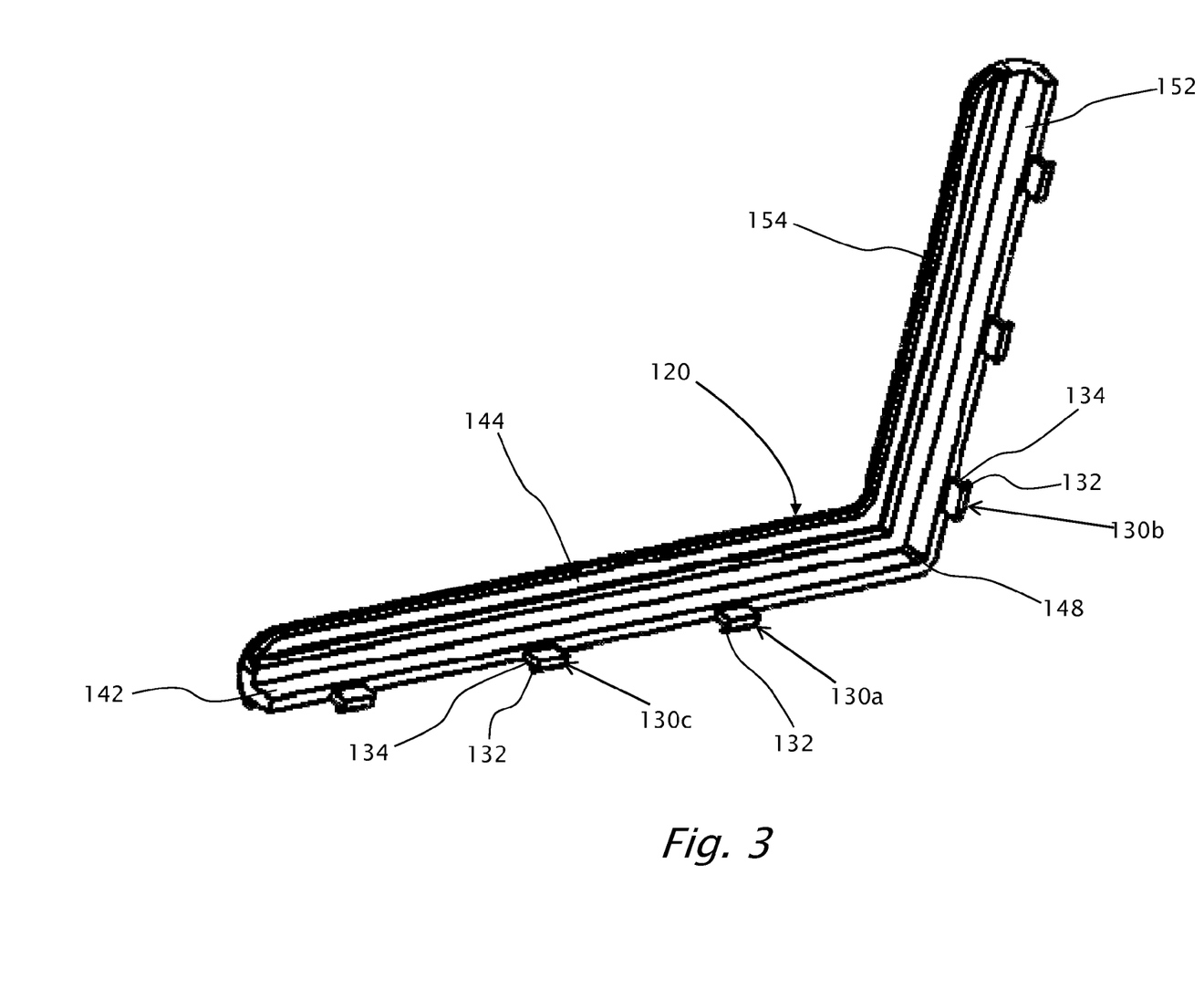
FIG. 3 illustrates a back perspective view of a support structure for an image acquisition apparatus as shown in FIG. 2, according to variations of the present invention.
Figure 4:
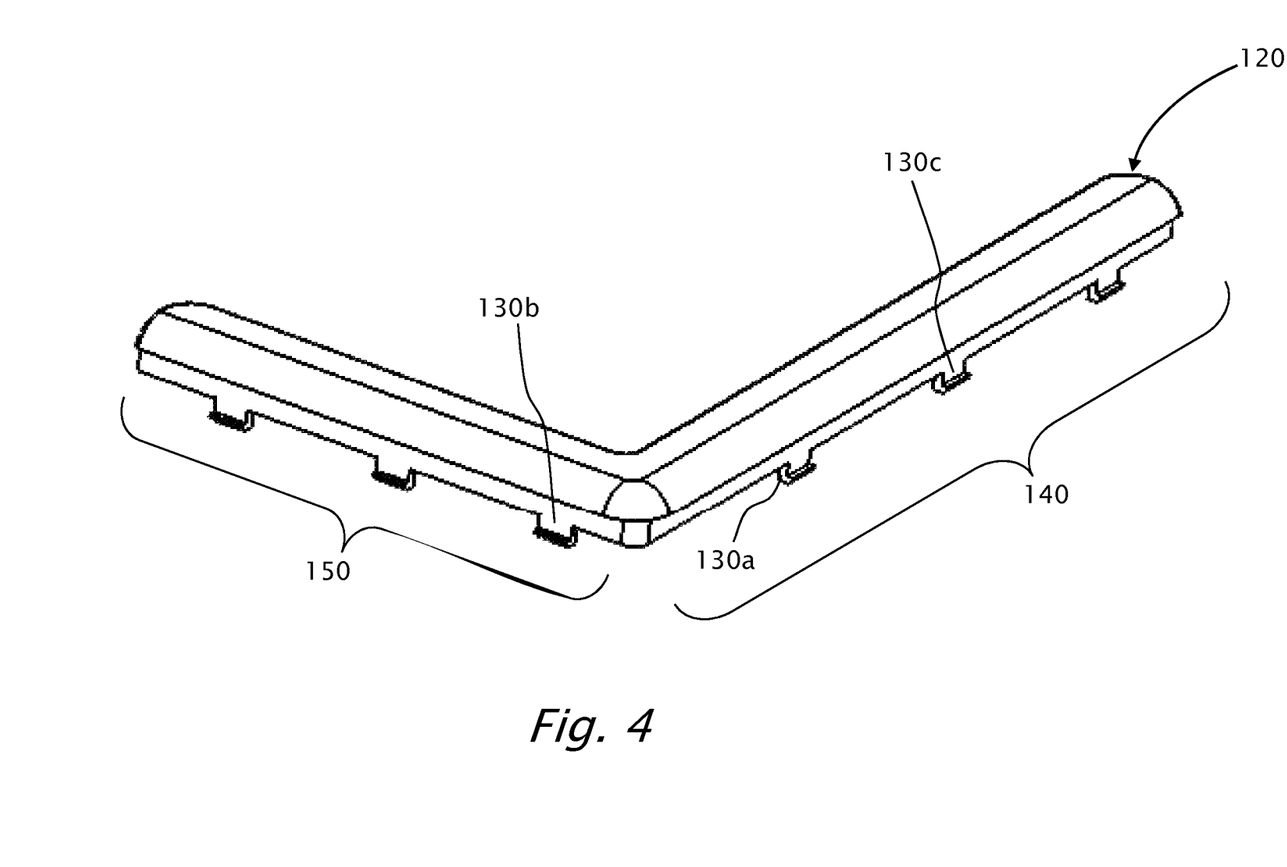
FIG. 4 illustrates a front perspective view of a support structure for an image acquisition apparatus as shown in FIG. 3.

Reference is also made to FIG. 3, which illustrates a back perspective view of a support structure 110, and to FIG. 4 which illustrates a front perspective view of support structure 110.

Figure 5:
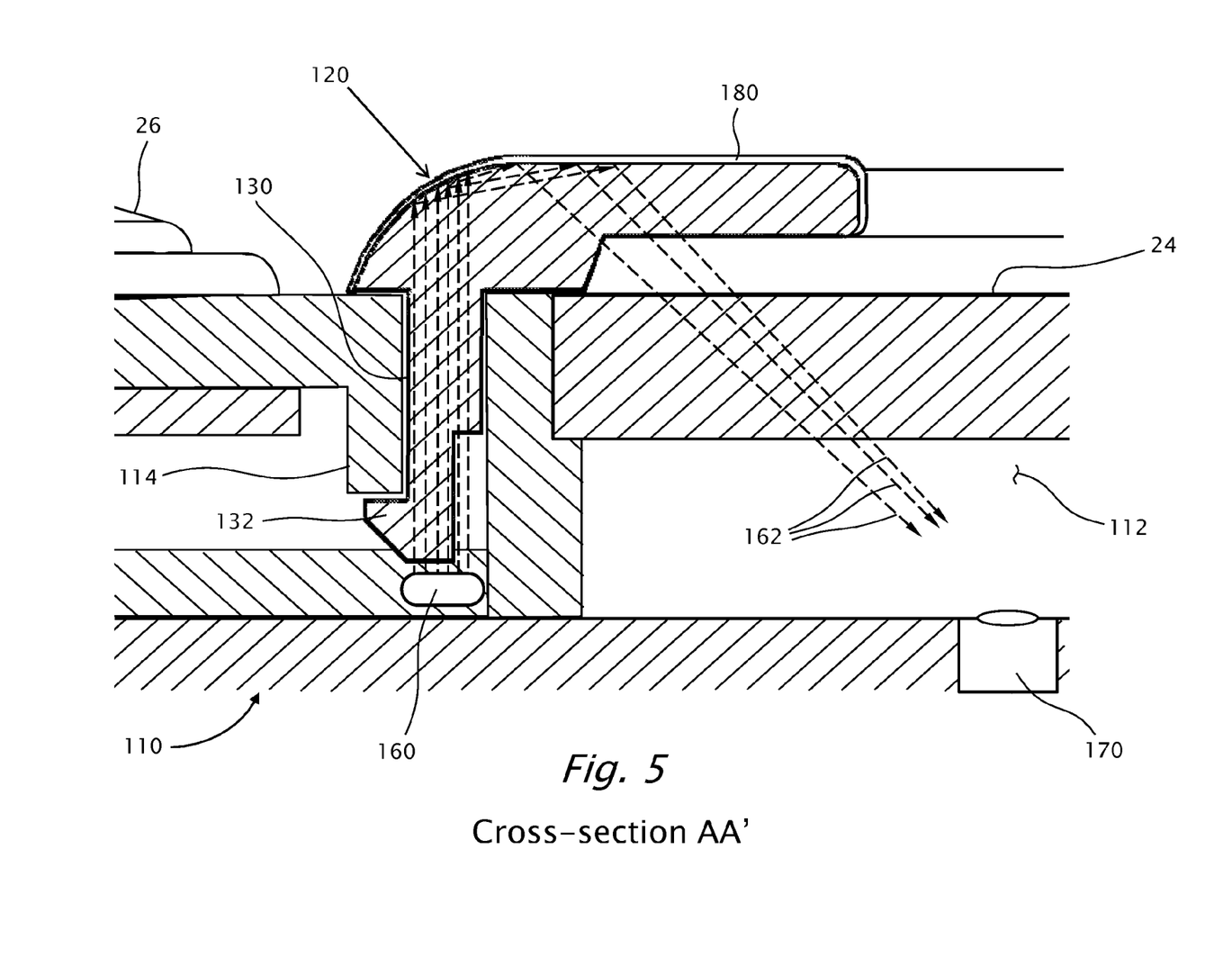
FIG. 5 is a side view cross section A-A' of the portable image acquisition apparatus as shown in FIG. 2.
Figure 6:
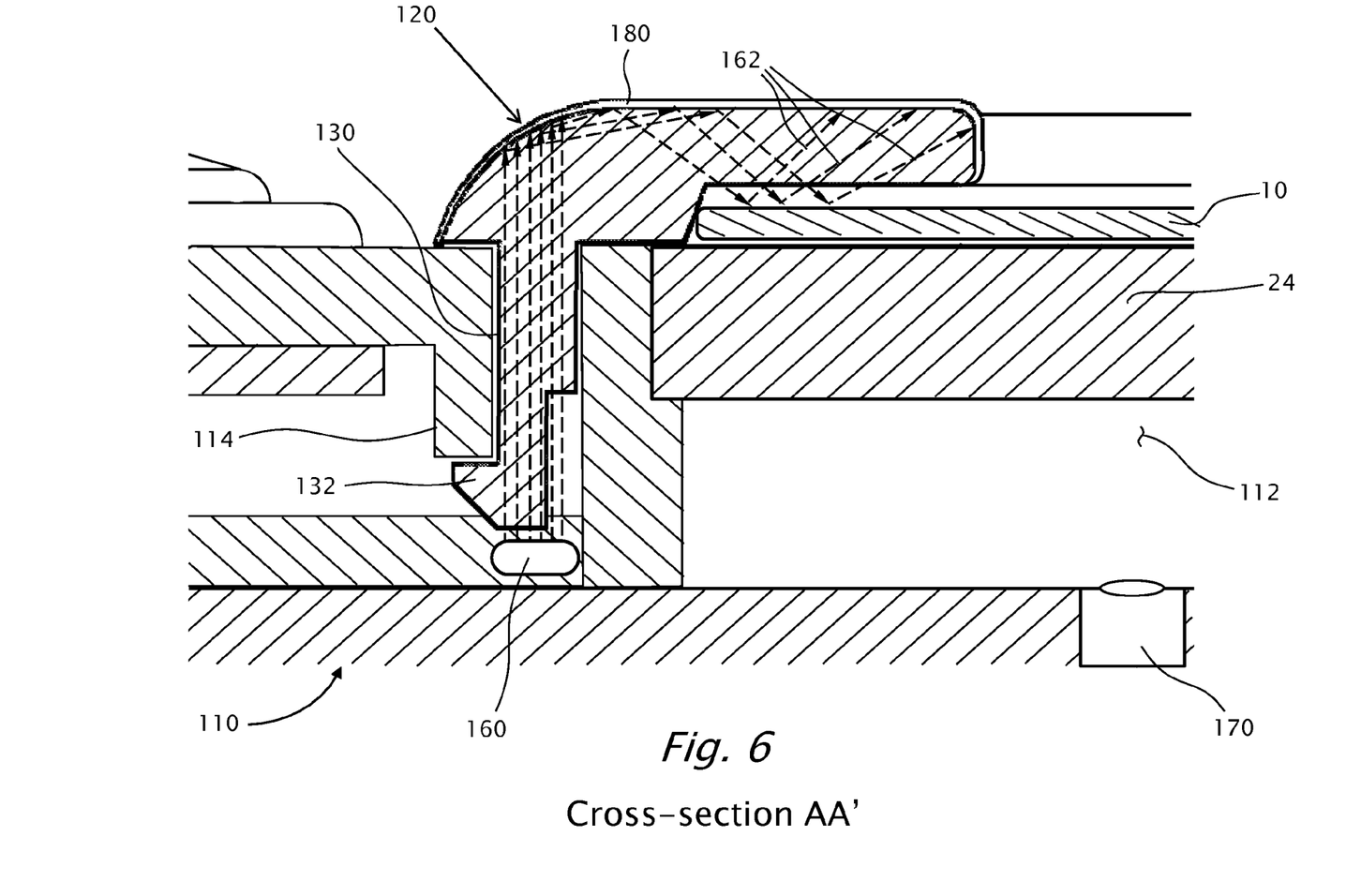
FIG. 6 illustrates the side view cross section A-A' of the portable image acquisition apparatus as shown in FIG. 2, having a document placed for imaging.

Reference is also made to FIG. 5, which is a side view cross section A-A' of image acquisition apparatus 100 as shown in FIG. 2, and to FIG. 6, which illustrates the side view cross section A-A' of an image acquisition apparatus 100, having a document 10 placed for imaging.

The device for detecting if at least a portion of transparent surface 24 is covered by a tangible document 10, includes transparent support structure 120 for supporting at least one edge of document 10, a layer of coating 180 configured to reflect light covering at least a portion of the external surfaces of transparent support structure 120, one or more light source 160 and a light intensity sensor (not shown) disposed inside the internal space of housing 110.

Transparent support structure 120 includes one or more (preferably two) supporting elements 140 and/or 150, having a supporting surface (142 and 152, respectively) for supporting edges of tangible document 10, wherein the supporting surfaces (142 and 152) are disposed in alignment with respective edges of transparent surface 24. For example, supporting surface 142 is aligned with the bottom edge of transparent surface 24 and supporting surface 152 is aligned with the left edge of transparent surface 24.

Transparent support structure 120 further includes one or more transparent attachment structures 130 for firmly attaching support structure 120 to housing 110, which housing 110 is configured to receive the one or more attachment structures 130.

In a preferred embodiment, transparent support structure 120 includes two supporting elements 140 and 150, forming an L-shaped structure. Supporting surfaces 142 and 152, for supporting edges of tangible document 10, are preferably orthogonal to each other and joint to form corner 148. Walls 144 and 154, respectively, support document 10 to stay adjacent to transparent surface 24. It should be noted that when a tangible document 10 is positioned for imaging on transparent surface 24, it is desired that corresponding edges of tangible document 10 are placed adjacent to supporting surfaces 142 and 152, respectively.

In a preferred embodiment, an example of which is illustrated in FIGS. 3-6, transparent support structure 120 includes three boss-type transparent attachment structures 130a, 130b and 130c. Attachment structures 130 are substantially parallel to each other erecting from supporting surfaces 142 and 152, away from inner walls 144 and 154, and perpendicular to the planer formed by the surfaces of inner walls 144 and 154.

Each boss type transparent attachment structures 130 includes an arm that has a flexible section 134, proximal to supporting elements 140 and 150. At the open end of attachment structures 130, a tooth like protrusion 132 extends from attachment structures 130, whereas the wall at the open end of attachment structures 130 is the sloped wall and the wall distal from the open end of attachment structures 130 is generally perpendicular to attachment structures 130. When assembling support structure 120 into corresponding cavities formed in housing 110, the sloped wall of protrusion 132 slides over a respective part 114 (see FIG. 5) of housing 110, having flexible section 134 bending away from part 114. When reaching the end of part 114, flexible section 134 bending returns to a straight form, locking attachment structures 130 into housing 110.

A light source 160 is operatively coupled with each attachment structures 130, positioned proximal to the open end of attachment structures 130, such that a substantial portion of the light beams 162 emitted from light source 160 is directed towards transparent attachment structures 130, and thereby towards transparent support structure 120.

The layer of coating 180 covers at least a portion of the external surfaces of transparent support structure 120. Preferably, layer of coating 180 covers substantially all of the external surfaces of transparent support structure 120, such that light 162 omitted from light source 160 cannot be view through transparent support structure 120.

Layer of coating 180 reflects a substantial portion of the light 162 emitted by light source 160 and transmitted thorough attachment structures 130 and transparent support structure 120, towards transparent surface 24 and the internal space of housing 110.

When transparent surface 24 is exposed, a substantial portion of the light 162 reflected towards transparent surface 24 is sensed by a light intensity sensor 170 disposed inside the internal space 112 of housing 110. Thereby, light intensity sensor detected a high intensity level of light. FIG. 5 illustrate the path of light beams 162, travelling from light source 160 all the way to light intensity sensor 170.

When a tangible document 10 is positioned for imaging on transparent surface 24, tangible document 10 blocks a substantial portion of the light 162 reflected towards transparent surface 24 from reaching transparent surface 24 and thereby also blocks a substantial portion of the light 162 from reaching light intensity sensor 170. Thereby, light intensity sensor 170 detected a high intensity high intensity level of light. The difference between the high intensity level light and the low intensity level is associated with the presence of tangible document on transparent surface 24, and is used to commence an imaging operation of document 10 by image acquisition apparatus 100. FIG. 6 illustrate the path of light beams 162, travelling from light source 160 all the way until blocked from reaching light intensity sensor 170 by an inserted document 10.

Preferably, the camera of image acquisition apparatus 100 is serves also as the light intensity sensor of the device for detecting a tangible document 10 being positioned for imaging on transparent surface 24.

It should be noted that the distance the first and second transparent attachment structures (130a and 130b) from corner 148 is inversely proportional to the alignment accuracy of tangible document 10 on transparent surface 24. Often, to reduce the size of apparatus 100, when the imaged document is of known size, for example driver's license, transparent surface 24 is designed to be slightly larger than the dimensions of a standard driver's license, typically, 2-5 mm larger. To ensure the whole document is imaged document 10 has to be positioned substantially at corner 148, no more than 2 mm from corner 148. By placing, for example, transparent attachment structure 130b near to corner 148 can ensure that apparatus 100 will not be operable when document 10 is positioned more than 2 mm from corner 148, for example.

Although the present invention has been described with reference to the preferred embodiment and examples thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the following claims.

What is claimed is:

1. In an image acquisition apparatus, including a housing having an internal space and a substantially transparent surface for supporting a tangible document during an image acquisition operation, a document sensing device for detecting if at least a portion of said transparent surface is covered by said tangible document, said document sensing device comprising:
   (a) a transparent support structure for supporting at least one edge of said tangible document comprising:
      i. a first supporting element having a first supporting surface for supporting a first edge of said tangible document, wherein said supporting surface is disposed in alignment with a first edge of said transparent surface; and
      ii. a first transparent attachment structure for firmly attaching said support structure to said housing;
   (b) a layer of coating configured to reflect light, wherein said layer of coating covering at least a portion of the external surfaces of said transparent support structure;
   (c) a first light source; and
   (d) a light intensity sensor disposed inside said internal space,
   wherein said first light source is disposed inside said image acquisition apparatus, directionally illuminating said first attachment structure towards said first supporting element;
   wherein said layer of coating reflects a substantial portion of the light transmitted by said first light source, towards said transparent surface and said internal space;
   wherein a substantial portion of said light is sensed by said light intensity sensor, said transparent surface being exposed, whereby said light intensity sensor detected a high intensity level, and wherein when said tangible document blocks a substantial portion of said light from reaching said transparent surface, said light intensity sensor detected a low intensity level; and
   wherein the difference between said high intensity level and said low intensity level is associated with the presence of said tangible document on said transparent surface.

2. The document sensing device of claim 1, wherein said image acquisition apparatus further includes an image sensor disposed inside said internal space for acquiring an image associated with said tangible document, and wherein said image sensor also used as said first light intensity sensor.

3. The document sensing device of claim 1, wherein said transparent surface is in a generally upright or inclined orientation and wherein said first edge of said transparent surface is generally horizontal, whereby during an imaging operation, said tangible document is supported by said first supporting element, resisting the force of gravity.

4. The document sensing device of claim 1, wherein said transparent support further comprises:

iii. a second supporting element having a second supporting surface for supporting a second edge of said tangible document, wherein said supporting surface is disposed in alignment with a second edge of said transparent surface; and iv. a second transparent attachment structure for firmly attaching said support structure to said housing.

5. The document sensing device of claim 4, wherein said second supporting element is substantially perpendicular to said first supporting element.

6. The document sensing device of claim 5, wherein said second supporting element and said first supporting element form an L-shaped structure, joining at a corner, wherein a second light source is disposed inside said image acquisition apparatus, coupled with said second attachment structure, thereby directionally illuminating said second attachment structure towards said second supporting element.

7. The document sensing device of claim 6, wherein when said tangible document is positioned adjacent to said second supporting surface, said tangible document blocks a substantial portion of the light transmitted by said second light source through said second supporting element, from reaching said transparent surface and thereby from reaching said light intensity sensor, whereby said light intensity sensor detects a low intensity level.

8. The document sensing device of claim 6, wherein the distance of each of said first and second transparent attachment structures from said corner is inversely proportional to the alignment accuracy of said tangible document on said transparent surface.

9. The document sensing device of claim 6, wherein at least one additional transparent attachment structure is positioned at a distal distance from said corner with respect to said first supporting element.

10. The document sensing device of claim 9, wherein at least one of said additional attachment structure is positioned at a distal distance from said corner with respect to said first attachment structure, said at least one additional attachment structure is coupled with a light source.

11. The document sensing device of claim 10, wherein an attachment structure selected from the group consisting of said first attachment structure, said second attachment structure and said additional attachment structures, is a boss type attachment structure.

* * * * *